United States Patent
Mitchell (10) Patent No.: US 8,954,029 B2
(45) Date of Patent: *Feb. 10, 2015

(54) INTEGRATED SERVICES USER PART (ISUP)/SESSION INITIATION PROTOCOL (SIP) GATEWAY FOR UNLICENSED MOBILE ACCESS (UMA) EMERGENCY SERVICES CALL FLOW

(71) Applicant: TeleCommunication Systems, Inc., Annapolis, MD (US)

(72) Inventor: Don Mitchell, Bellevue, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,029

(22) Filed: Jul. 15, 2013

(65) Prior Publication Data

US 2013/0303196 A1 Nov. 14, 2013

Related U.S. Application Data

(63) Continuation of application No. 13/341,461, filed on Dec. 30, 2011, now Pat. No. 8,489,064, which is a continuation of application No. 11/487,334, filed on Jul. 17, 2006, now Pat. No. 8,090,341.

(60) Provisional application No. 60/699,862, filed on Jul. 18, 2005.

(51) Int. Cl.
*H04M 11/04* (2006.01)
*H04W 4/02* (2009.01)
(Continued)

(52) U.S. Cl.
CPC ............... *H04W 4/02* (2013.01); *G01S 5/0018* (2013.01); *H04L 29/06027* (2013.01);
(Continued)

(58) Field of Classification Search
CPC ..... H04W 76/007; H04W 4/22; H04W 11/04; H04L 29/06027; H04M 7/006; H04M 11/04; H04M 2242/04

USPC .......................... 455/404.1; 370/352; 379/37
See application file for complete search history.

(56) References Cited

U.S. PATENT DOCUMENTS 4,625,081 A 11/1986 Lotito
5,712,900 A 1/1998 Maupin
(Continued)

FOREIGN PATENT DOCUMENTS

DE WO/2004021726 3/2004
WO WO/2003039009 5/2003
WO WO/2005060292 6/2005

OTHER PUBLICATIONS

PCT Notification of Transmittal of the International Search Report and the Written Opinion of the International Searching Authority, or the Declaration, Feb. 14, 2008.

(Continued)

*Primary Examiner* — Simon King
(74) *Attorney, Agent, or Firm* — William H. Bollman (57) ABSTRACT

An ISUP/SIP gateway is implemented to encapsulate SS7 location requests from a switched telephone network into an Internet protocol SIP message including one or more location objects. The ISUP/SIP gateway is implemented between a mobile switching center (MSC) and a VoIP positioning center (VPC) to provide support of unlicensed mobile access (UMA) voice over Internet Protocol (VoIP) call routing, e.g., for E9-1-1, 4-1-1, 2-1-1, etc. The disclosed location objects that are encapsulated into a SIP message includes calling party number, called party number, CGI, International Mobile Subscriber Identity (IMSI), mobility indicator, and/or access point MAC address. At the SIP/ISUP gateway, SS7 integrated services user part (ISUP) location request messages are encapsulated within SIP. The SIP encapsulated location request message is then routed over the Internet to a destination VoIP positioning center (VPC).

7 Claims, 8 Drawing Sheets

(51) Int. Cl.
*G01S 5/00* (2006.01)
*H04L 29/06* (2006.01)
*H04M 3/42* (2006.01)
*H04M 7/12* (2006.01)
*H04W 4/22* (2009.01)
*H04W 64/00* (2009.01)
*H04W 76/00* (2009.01)
*H04W 80/02* (2009.01)
*H04W 88/16* (2009.01)

(52) U.S. Cl.
CPC ...... *H04L 65/1006* (2013.01); *H04M 3/42348* (2013.01); *H04M 7/123* (2013.01); *H04L 65/1043* (2013.01); *H04L 65/104* (2013.01); *H04L 65/1069* (2013.01); *H04L 65/103* (2013.01); *H04L 65/4007* (2013.01); *H04L 69/08* (2013.01); *H04M 2242/04* (2013.01); *H04M 2242/14* (2013.01); *H04M 2242/30* (2013.01); *H04W 4/22* (2013.01); *H04W 64/00* (2013.01); *H04W 76/007* (2013.01); *H04W 80/02* (2013.01); *H04W 88/16* (2013.01)
USPC .......................... 455/404.1; 379/37; 370/352

(56) References Cited

U.S. PATENT DOCUMENTS

| | | |
|---|---|---|
| 5,937,344 A | 8/1999 | Zicker |
| 6,275,937 B1 | 8/2001 | Hailpern |
| 6,438,223 B1 | 8/2002 | Eskafi |
| 6,535,743 B1 | 3/2003 | Kennedy, III |
| 6,556,816 B1 | 4/2003 | Gafrick |
| 6,865,266 B1 | 3/2005 | Pershan |
| 6,925,504 B1 | 8/2005 | Liskov |
| 7,031,724 B2 | 4/2006 | Ross |
| 7,194,249 B2 | 3/2007 | Phillips |
| 7,277,938 B2 | 10/2007 | Duimovich |
| 7,516,198 B1 | 4/2009 | Appala |
| 7,526,563 B2 | 4/2009 | Ingimundarson |
| 7,617,287 B2 | 11/2009 | Vella |
| 7,627,331 B2 | 12/2009 | Winterbottom |
| 7,684,782 B2 | 3/2010 | Ashley |
| 7,822,871 B2 | 10/2010 | Stolorz |
| 7,895,263 B1 | 2/2011 | Kirchmeier |
| 2002/0055924 A1 | 5/2002 | Liming |
| 2002/0069079 A1 | 6/2002 | Vega |
| 2002/0086659 A1 | 7/2002 | Lauper |
| 2002/0099802 A1 | 7/2002 | Marsh |
| 2002/0111159 A1 | 8/2002 | Faccin |
| 2002/0113797 A1 | 8/2002 | Potter |
| 2002/0136364 A1 | 9/2002 | Stumer |
| 2002/0141386 A1 | 10/2002 | Minert |
| 2002/0154221 A1 | 10/2002 | Ishimaru |
| 2002/0174073 A1 | 11/2002 | Nordman |
| 2003/0063714 A1 | 4/2003 | Stumer |
| 2003/0063730 A1 | 4/2003 | Woodring |
| 2003/0069002 A1 | 4/2003 | Hunter |
| 2003/0081752 A1 | 5/2003 | Trandal |
| 2003/0081754 A1 | 5/2003 | Esparza |
| 2003/0115261 A1 | 6/2003 | Mohammed |
| 2003/0125021 A1 | 7/2003 | Tell |
| 2003/0135493 A1 | 7/2003 | Phelan et al. |
| 2003/0163483 A1 | 8/2003 | Zingher |
| 2003/0186709 A1 | 10/2003 | Rhodes |
| 2003/0187803 A1 | 10/2003 | Pitt |
| 2003/0222901 A1 | 12/2003 | Houck |
| 2004/0064500 A1 | 4/2004 | Kolar et al. |
| 2004/0093217 A1 | 5/2004 | Yeh |
| 2004/0107143 A1 | 6/2004 | Niemi |
| 2004/0150518 A1 | 8/2004 | Phillips |
| 2004/0156394 A1 | 8/2004 | Westman |
| 2004/0157175 A1 | 8/2004 | Matsumoto |
| 2004/0184584 A1 | 9/2004 | McCalmont |
| 2004/0190497 A1 | 9/2004 | Knox |
| 2004/0203568 A1 | 10/2004 | Kirtland |
| 2004/0203919 A1 | 10/2004 | Ross |
| 2004/0242191 A1 | 12/2004 | Hossain |
| 2004/0247090 A1 | 12/2004 | Nurmela |
| 2005/0030977 A1 | 2/2005 | Casey |
| 2005/0031095 A1 | 2/2005 | Pietrowicz |
| 2005/0039135 A1 | 2/2005 | Othmer |
| 2005/0047399 A1 | 3/2005 | Lee et al. |
| 2005/0071251 A1 | 3/2005 | Linden |
| 2005/0144322 A1 | 6/2005 | Miyajimma |
| 2005/0148353 A1 | 7/2005 | Hicks, III et al. |
| 2005/0181805 A1 | 8/2005 | Gallagher |
| 2005/0186948 A1 | 8/2005 | Gallagher |
| 2005/0188078 A1 | 8/2005 | Kotzin |
| 2005/0190892 A1 | 9/2005 | Dawson |
| 2005/0195954 A1 | 9/2005 | Klein |
| 2005/0201358 A1 | 9/2005 | Nelson et al. |
| 2005/0202799 A1 | 9/2005 | Rollender |
| 2005/0213537 A1 | 9/2005 | Ingimundarson |
| 2005/0215233 A1 | 9/2005 | Perera |
| 2005/0216300 A1 | 9/2005 | Appleman |
| 2005/0272424 A1 | 12/2005 | Gallagher |
| 2005/0286466 A1* | 12/2005 | Tagg et al. ............ 370/329 |
| 2005/0287979 A1 | 12/2005 | Rollender |
| 2006/0044407 A1 | 3/2006 | Barbeau |
| 2006/0073812 A1 | 4/2006 | Punaganti |
| 2006/0079236 A1 | 4/2006 | Del Pino |
| 2006/0099935 A1 | 5/2006 | Gallagher |
| 2006/0106774 A1 | 5/2006 | Cohen |
| 2006/0135177 A1 | 6/2006 | Winterbottom |
| 2006/0154665 A1 | 7/2006 | Svensson |
| 2006/0184617 A1 | 8/2006 | Nicholas |
| 2006/0189303 A1 | 8/2006 | Rollender |
| 2006/0205383 A1 | 9/2006 | Rollender |
| 2006/0206610 A1 | 9/2006 | Ling |
| 2006/0236258 A1 | 10/2006 | Othmer |
| 2007/0008885 A1 | 1/2007 | Bonner |
| 2007/0027997 A1 | 2/2007 | Polk |
| 2007/0060097 A1 | 3/2007 | Edge |
| 2007/0104183 A1 | 5/2007 | Bakke |
| 2007/0190968 A1 | 8/2007 | Dickinson |
| 2007/0202844 A1 | 8/2007 | Wilson |
| 2007/0218871 A1 | 9/2007 | Bonner |
| 2007/0238448 A1 | 10/2007 | Gallagher et al. |
| 2008/0045250 A1 | 2/2008 | Hwang |
| 2008/0080488 A1 | 4/2008 | Marsico |
| 2008/0208671 A1 | 8/2008 | Ehrlich |
| 2008/0313000 A1 | 12/2008 | Degeratu |
| 2009/0054070 A1* | 2/2009 | Gallagher et al. ............ 455/445 |
| 2009/0020447 A1 | 8/2009 | Elenbass |
| 2009/0198733 A1 | 8/2009 | Gounares |
| 2009/0204600 A1 | 8/2009 | Kalik et al. |
| 2010/0010860 A1 | 1/2010 | Bose |
| 2010/0198933 A1 | 8/2010 | Smith |
| 2010/0262668 A1 | 10/2010 | Piett |
| 2011/0149838 A1* | 6/2011 | Gallagher et al. ............ 370/328 |
| 2012/0079620 A1 | 3/2012 | Kellerman |
| 2013/0288640 A1* | 10/2013 | Bonner ....................... 455/406 |
| 2013/0315384 A1* | 11/2013 | Coster et al. ................ 379/45 |

OTHER PUBLICATIONS

Winterbottom et al., GEOPRIV PIDF-LO Usage Clarification, Considerations and Recommendations, Geopriv, Feb. 12, 2005, pp. 1-19.
Linden, Greg, Geeking with Greg, Exploring the Future of Personalized Information, glinden.blogspot.com, pp. 1-2.
European Search Report in Appl. No. EP07 71 6216 dated Dec. 12, 2009.
Zehua et al., "On Querying Geospatial and Georeferenced Metadata Resources in G-Portal," IEEE Comp. SOC, May 31, 2003, pp. 245-255.
Peterson et al., "A Presence-Based GEOPRIV Location Object Format; rfc4119,txt," Neustar, Dec. 1, 2005, pp. 1-23.
Winterbottom, et al., "GEOPRIV PIDF-Lo Usage Clarification, Considerations and Recommendations; draft-ietf-geopriv-pdif-lo-profile-00.txt," Nortel, Jul. 2, 2005, pp. 1-31.
Berners-Lee, et al., "Uniform Resource Identifier (URI) Generic Standard, Internet Engineering Task Force," Day Software, Jan. 1, 2005, pp. 1-61.

(56) References Cited

OTHER PUBLICATIONS http://en.wikipedia.org/wiki/imsi, Wikipedia Encyclopedia, International Mobile Subscriber Identity, pp. 1-4, printed on Sep. 4, 2008.
Harry Newton, Newton's Telecom Dictionary, Feb. 2000, Telecom Books, 16$^{th}$ edition, p. 427.
International Search Report received in PCT/US2006/27658 dated Feb. 13, 2007.
International Search Report received in PCT/US2012/00266 dated Aug. 3, 3012.
International Search Report received in PCT/US2012/066313 dated Feb. 4, 2013.
International Search Report received in PCT/US2012/067857 dated Feb. 20, 2013.
International Search Report received in PCT/US2012/67689 dated Feb. 22, 2013.

* cited by examiner

INTEGRATED SERVICES USER PART (ISUP)/SESSION INITIATION PROTOCOL (SIP) GATEWAY FOR UNLICENSED MOBILE ACCESS (UMA) EMERGENCY SERVICES CALL FLOW

The present application is a continuation of U.S. application Ser. No. 13/341,461, entitled "Integrated Services User Part (ISUP)/Session Initiation Protocol (SIP) Gateway for Unlicensed Mobile Access (UMA) Emergency Services Call Flow," filed on Dec. 30, 2011, now U.S. Pat. No. 8,489,064; which is a continuation of U.S. application Ser. No. 11/487,334, entitled "Integrated Services User Part (ISUP)/Session Initiation Protocol (SIP) Gateway for Unlicensed Mobile Access (UMA) Emergency Services Call Flow," filed on Jul. 17, 2006, now U.S. Pat. No. 8,090,341 issued on Jan. 3, 2012; which claims priority from U.S. Provisional Patent Application No. 60/699,862, filed Jul. 18, 2005, entitled "Integrated Services User Part (ISUP)/Session Initiation Protocol (SIP) Gateway For Unlicensed Mobile Access (UMA) Emergency Services Call Flow", to Don Mitchell, the entirety of both of which are explicitly incorporated herein by reference.

BACKGROUND OF THE INVENTION

1. Field of the Invention

This invention relates generally to wireless telecommunication. More particularly, it relates to Voice Over Internet Protocol (VoIP) E9-1-1 call flows supporting unlicensed mobile access (UMA).

2. Background of the Related Art

Unlicensed Mobile Access (UMA) is the Third Generation Partnership (3GPP) standard for cellular and wireless fidelity (WiFi) convergence. The UMA specifications are publicly available, e.g., from the UMA Technology web site (www.u-matechnology.org) as well as from the 3GPP web site (www.3gpp.org).

The UMA effort was initiated by leading operators and vendors in the wireless industry, with a goal of developing a set of technical specifications for extending mobile voice, data and IP Multimedia Subsystem (IMS) services over broadband IP and Wi-Fi access networks. On Apr. 8, 2005, the specifications were officially incorporated into 3GPP Release 6, making UMA the true global standard for cellular/Wi-Fi convergence. The UMA effort has been a tremendous success, having developed a new global communications standard in a period of less than 15 months.

For mobile operators, Wi-Fi had been viewed as somewhat of a threat. Now, UMA provides a secure, managed IP connection established between a mobile handset and the operator's core network. Thus all of an operator's mobile services (voice, data, and IMS) are available to the subscriber when connected via Wi-Fi. In addition, with UMA, active voice calls and data sessions are automatically handed over between networks as subscribers come in and out of range of WLANs. Thus, with the use of UMA, Wi-Fi no longer poses a threat to mobile operators because they maintain control of their subscribers and services even when connected via Wi-Fi.

The current UMA E9-1-1 standard calls for E9-1-1 calls NOT to be processed over the IP network but instead to be transitioned to a GSM TDM call flow. However, the present inventors have realized that this is a problem because of the high potential for such a transitioned E9-1-1 call to be dropped. Needless to say, a significant number of dropped emergency calls are problematic and the source of potential liabilities to an operator.

Some GSM carriers have followed different implementations of the UMA E9-1-1 call flow. For instance, at least one carrier (e.g., T-Mobile™) has implemented an approach utilizing a serving mobile location center (SMLC). Unfortunately, disadvantages with such conventional solutions include the fact that switching E9-1-1 calls back to a time division multiplexed (TDM) system may cause those calls to drop in houses having poor cellular coverage.

There is a need for a more reliable handling of emergency calls that use UMA.

SUMMARY OF THE INVENTION

In accordance with the principles of the present invention, a method and apparatus for providing location based support to a call made via a UMA network comprises encapsulating a location request with respect to a call from a UMA phone. The location request is received by an ISUP/SIP gateway and encapsulated in a SIP message. The SIP encapsulated location request is passed to a VoIP positioning center.

In accordance with another aspect of the present invention, an architecture link between a mobile switching center (MSC) and a VoIP positioning center (VPC) to support location based services comprises an SS7 based ISUP/SIP gateway. The ISUP/SIP gateway is operable to encapsulate a received location request into an Internet Protocol message.

DETAILED DESCRIPTION OF ILLUSTRATIVE EMBODIMENTS

An ISUP/SIP gateway is implemented to encapsulate SS7 location requests from a switched telephone network into an Internet protocol SIP message including one or more location objects. The ISUP/SIP gateway is implemented between a mobile switching center (MSC) and a VoIP positioning center (VPC) to provide support of unlicensed mobile access (UMA) voice over Internet Protocol (VoIP) call routing, e.g., for E9-1-1, 4-1-1, 2-1-1, etc. The disclosed location objects that are encapsulated into a SIP message includes calling party number, called party number, CGI, International Mobile Subscriber Identity (IMSI), mobility indicator, and/or access point MAC address. At the SIP/ISUP gateway, SS7 integrated services user part (ISUP) location request messages are encapsulated within SIP. The SIP encapsulated location request message is then routed over the Internet to a destination VoIP positioning center (VPC).

Session Initiation Protocol (SIP) is an application-layer control protocol that is conventionally used to establish, modify and terminate multimedia sessions or calls over the Internet. These multimedia sessions include multimedia conferences, Internet telephony and similar applications. SIP is one of the key protocols used to implement Voice over IP (VoIP).

The popularity of SIP-ISUP gateways that interwork between the public switched telephone network (PSTN) and SIP networks has motivated the publication of a set of common practices that can assure consistent behavior across implementations. An important basic requirement of these common practices is that the SIP telephone network be feature transparent with respect to the PSTN.

At a SIP-ISUP gateway, signaling system number 7 (SS7) integrated services user part (ISUP) messages consistent with the PSTN are encapsulated within SIP in such a way as to not discard in the SIP request information necessary for services. The encapsulated message is then routed over the Internet to a destination VoIP device.

However, after the service information is encapsulated within the SIP request, intermediaries like proxy servers that make routing decisions for SIP requests cannot be expected to understand ISUP. So simultaneously, some critical information is translated from an ISUP message into the corresponding SIP headers to indicate how the SIP request is to be routed.

The present invention implements an ISUP/SIP gateway, but not in a conventional manner to pass SS7 signaling from a switched telephone network over the Internet. Rather, the present invention implements an ISUP/SIP gateway between a mobile switching center (MSC) and a VoIP positioning center (VPC) to provide support of unlicensed mobile access (UMA) voice over Internet Protocol (VoIP) call routing, e.g., for E9-1-1, 4-1-1, 2-1-1, etc.

While disclosed with respect to embodiments providing an E9-1-1 solution, the principles of the present invention are equally applicable to applications outside of emergency services, e.g., 4-1-1, 2-1-1, etc.

Figure 1:
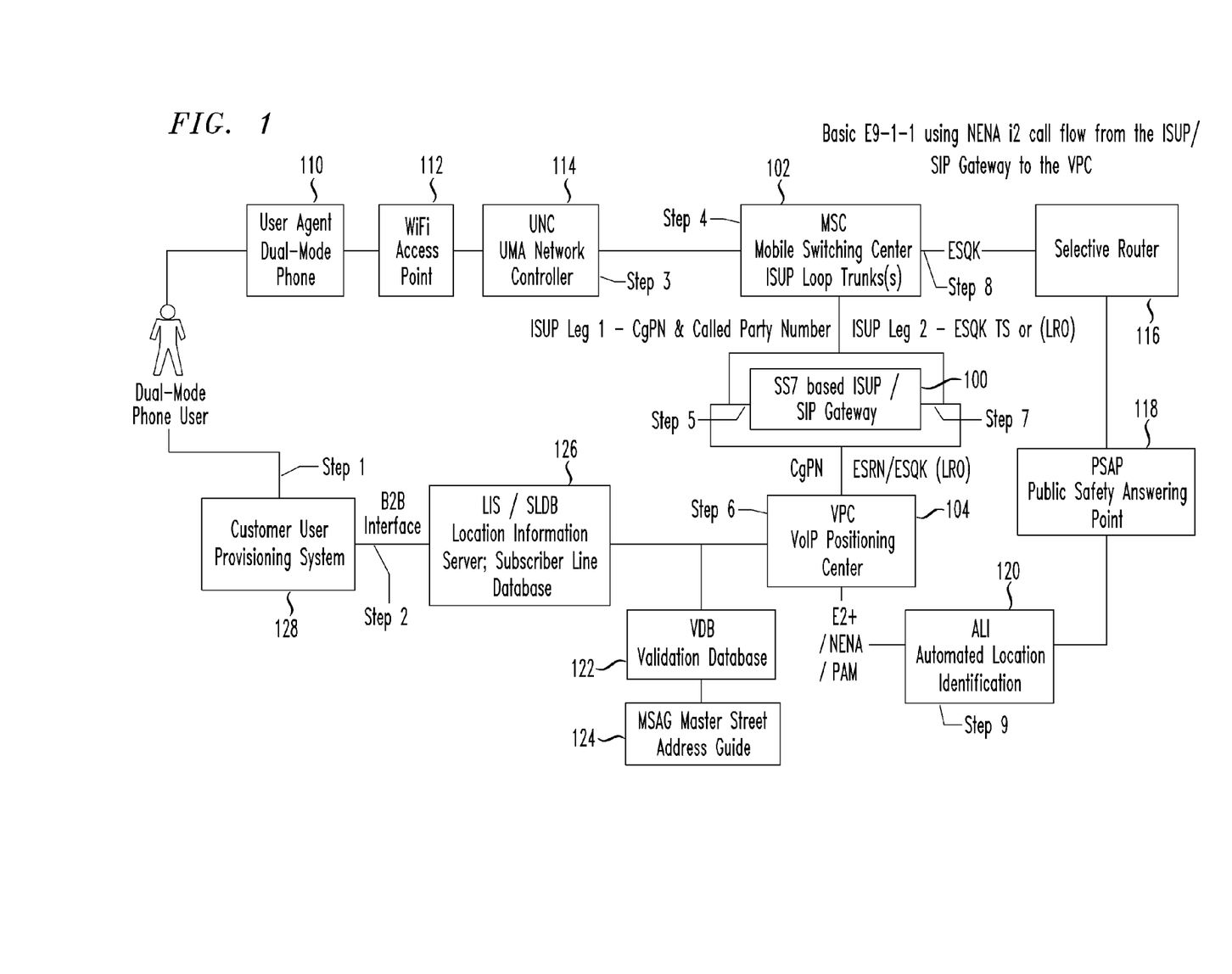
FIG. 1 shows an example location based UMA VoIP E9-1-1 basic call flow architecture using NENA i2 call flow through an ISUP/SIP gateway implemented between a mobile switching center (MSC) and a VoIP positioning center (VPC), in accordance with the principles of the present invention.

FIG. 1 shows an example location based UMA VoIP E9-1-1 basic call flow architecture using NENA i2 call flow through an ISUP/SIP gateway implemented between a mobile switching center (MSC) and a VoIP positioning center (VPC), in accordance with the principles of the present invention.

In particular, as shown in FIG. 1, a dual-mode phone user makes use of a wireless device including a dual-mode phone user agent 110. Wireless communication is established with a UMA network controller (UNC) 114 via a WiFi access point 112. An emergency call is routed to a mobile switching center (MSC) 102, which in turn routes the emergency call to a public safety answering point (PSAP) 118 via a selective router 116.

The dual-mode phone user provisions the dual-mode phone via a suitable user provisioning system 128. Location based services are provided by a VoIP positioning center (VPC) 104, an automated location identification (ALI) 120, a validation database (VDB) 122, master street address guide (MSAG) 124, and location information server/subscriber line database (LIS/SLDB) 126.

Importantly, an SS7 based ISUP/SIP gateway 100 is implemented between the MSC 102 and the VoIP positioning center 104. The ISUP/SIP gateway 100 in accordance with the present invention converts ISUP IAM parameters to SIP V6 parameters, the V6 interface being per NENA i2 definitions. In the opposite communication direction the ISUP/SIP gateway 100 converts from V4 parameters to ISUP signaling, the V4 interface being per NENA i2 definitions.

In the ISUP/SIP gateway 100, a WiFi access point hexadecimal MAC address is converted into decimal format and transmitted in an ISUP initial address message (IAM) parameter. In a preferred embodiment, a flag is included to indicate locateability of the handset or softphone.

Using the ISUP/Session Initiation Protocol (SIP) gateway 100, a wireless carrier is able to integrate their message servicing center (MSC) 102 across an SS7 network using standardized V6/V4 i2 call flows via ISUP signaling from ISUP loop-back trunks to a switching control point (SCP).

The MSC 102 implements translations that support i2 emergency services query key (ESQK)/emergency services routing number (ESRN) based call flows to an emergency services routing key (ESRK)/Trunk Select type call flow. The MSC 102 also preferably supports last routing option (LRO) i1 based call flows. The MSC 102 also preferably supports modified LRO to an operator routing support service (ORSS) (i.e., a private call center) i1 call flow.

This combination of ISUP (per ANSI) loop-trunks with V6/V4 standardized call flows provides a reliable solution to the UMA E9-1-1 problem otherwise incurred with conventional systems.

A wireless carrier offering dual-mode (WiFi/TDM) handsets can integrate their WLAN based E9-1-1 call flows from a standard MSC platform to a VoIP E9-1-1 VoIP positioning center (VPC) 104. This enables a wireless carrier to support civic/metro street address guide (MSAG)-quality address data with respect to the PSAP 118.

The wireless carrier may also implement mobility/nomadic support for their WiFi based call flows by implementing delivery of an access point MAC address across ISUP loop trunks, and by implementing software in the relevant wireless handsets to collect WiFi access points for an out-of-band location calculation.

As shown in step 1 of FIG. 1, the user provisions their current location address connected to their phone number or identity via a networked connection.

In step 2, the user location and phone identity data are transmitted to a database via an internetworked connection, and stored there. The connection between the user provisioning system 128 and the location information server (LIS)/ subscriber line database (SLDB) is referred to herein as a business-to-business (B2B) interface (generally XML).

In step 3, when the user makes a call that needs location based routing (like 9-1-1) from a WiFi network, the call progresses from their dual-mode UMA phone 110 to the UMA network controller 114 over VPN on the Internet.

In step 4, calls from UMA subscribers on a WiFi network that require location based routing are translated to an assigned ISUP loop-trunk. In the embodiment of FIG. 1, the IAM outbound message contains the calling party number (CgPN) and called party number (CPN).

In step 5, the ISUP/SIP gateway 100 translates the ISUP IAM parameters into SIP Invite parameters.

In step 6, the VoIP positioning center (VPC) 104 assigns routing based upon the location retrieved from the LIS/SLDB 126. The interface between the VoIP positioning center 104 and the ALI 120 may be, e.g., E2+, NENA or PAM compliant. E2+ is an ALI mobile positioning center (MPC) interface defined in the 3GPP2 J-STD-036 standard. NENA and PAM are two other existing industry standard ALI-MPC interfaces.

In step 7, the ISUP/SIP gateway 100 receives routing instruction from the VoIP positioning center (VPC) 104 and sends a routing key (e.g., ESQK) and a trunk select code (e.g. ESRN); or sends last routing option (LRO) as a fallback.

In step 8, the MSC 102 egresses the call based upon ESRN and sends ESQK to the selective router 116, which then routes to the PSAP 118.

In step 9, the PSAP customer premises equipment (CPE) then forms a query to the ALI 120. The ALI 120 then steers that query to the VoIP positioning center 104 based upon the ESQK and its steering tables. The VoIP positioning center (VPC) 104 responds with location (address) information.

In another embodiment, the validation database (VDB) validates the subscriber location address and assigns an MSAG address for delivery to the PSAP 118 to support the ALI query.

Figure 2:
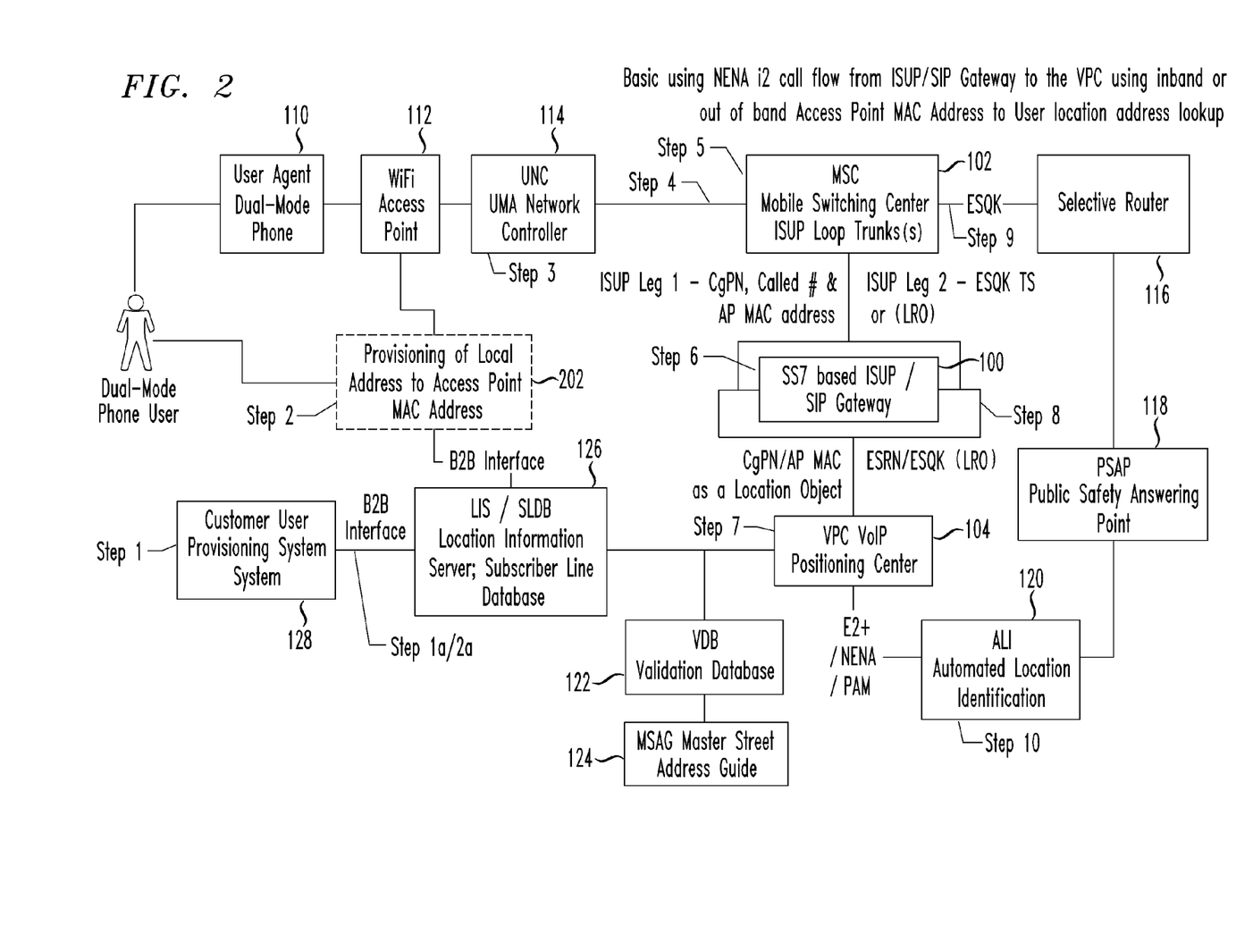
FIG. 2 shows an example location based UMA VoIP E9-1-1 basic call flow architecture using NENA i2 call flow from an ISUP/SIP gateway using inband or out of band access point MAC address to address lookup, in accordance with the principles of the present invention.

FIG. 2 shows an example location based UMA VoIP E9-1-1 basic call flow architecture using NENA i2 call flow from an ISUP/SIP gateway using inband or out of band access point MAC address to address lookup, in accordance with the principles of the present invention.

In particular, as shown in step 1 of FIG. 2, the user provisions their current location address connected to their phone number or identity via a networked connection.

In step 1a, the user location and phone identity are transmitted to a database via an internetworked connection, and stored there.

In step 2, the user provisions their current location address connected with their access point MAC address.

In step 2a, if not already transmitted in step 1a, the user location and phone identity data are again transmitted to a database via an internetworked connection, and stored there.

In step 3, when the user makes a call that needs location based routing (like 9-1-1) from a WiFi network 112, the call progresses from their dual-mode UMA phone 110 to the UMA network controller (UNC) 114 over VPN on the Internet.

In step 4, calls from UMA subscribers on a WiFi network that require location based routing are translated to an assigned ISUP loop-trunk. In the embodiment of FIG. 2, the IAM outbound message contains the calling party number (CgPN) and called party number (CPN). This is the same as with respect to the embodiment of FIG. 1. However, in the embodiment of FIG. 2, inband delivery of the access point MAC address in decimal is added to inband delivery using the generic digits parameter (GDP).

In step 5, the access point MAC address is converted from hexadecimal to decimal. This is passed as a 15-digit emergency services routing digit (ESRD) in the ISUP IAM Leg1 parameter.

In step 6, the ISUP/SIP gateway 100 translates the ISUP IAM parameters into SIP Invite parameters.

In step 7, the VoIP positioning center (VPC) 104 assigns routing based upon the location retrieved from the LIS/SLDB 126.

In step 8, the ISUP/SIP gateway 100 receives routing instruction from the VoIP positioning center (VPC) 104 and sends a routing key (e.g., ESQK) and a trunk select code (e.g. ESRN); or sends last routing option (LRO) as a fallback.

In step 9, the MSC 102 egresses the call based upon ESRN and sends ESQK to the selective router 116, which then routes to the PSAP 118.

In step 10, the PSAP customer premises equipment (CPE) then forms a query to the ALI 120. The ALI 120 then steers that query to the VoIP positioning center 104 based upon the ESQK and its steering tables. The VoIP positioning center (VPC) 104 responds with location (address) information.

In another embodiment, the validation database (VDB) validates the subscriber location address and assigns an MSAG address for delivery to the PSAP 118 to support the ALI query.

Figure 3:
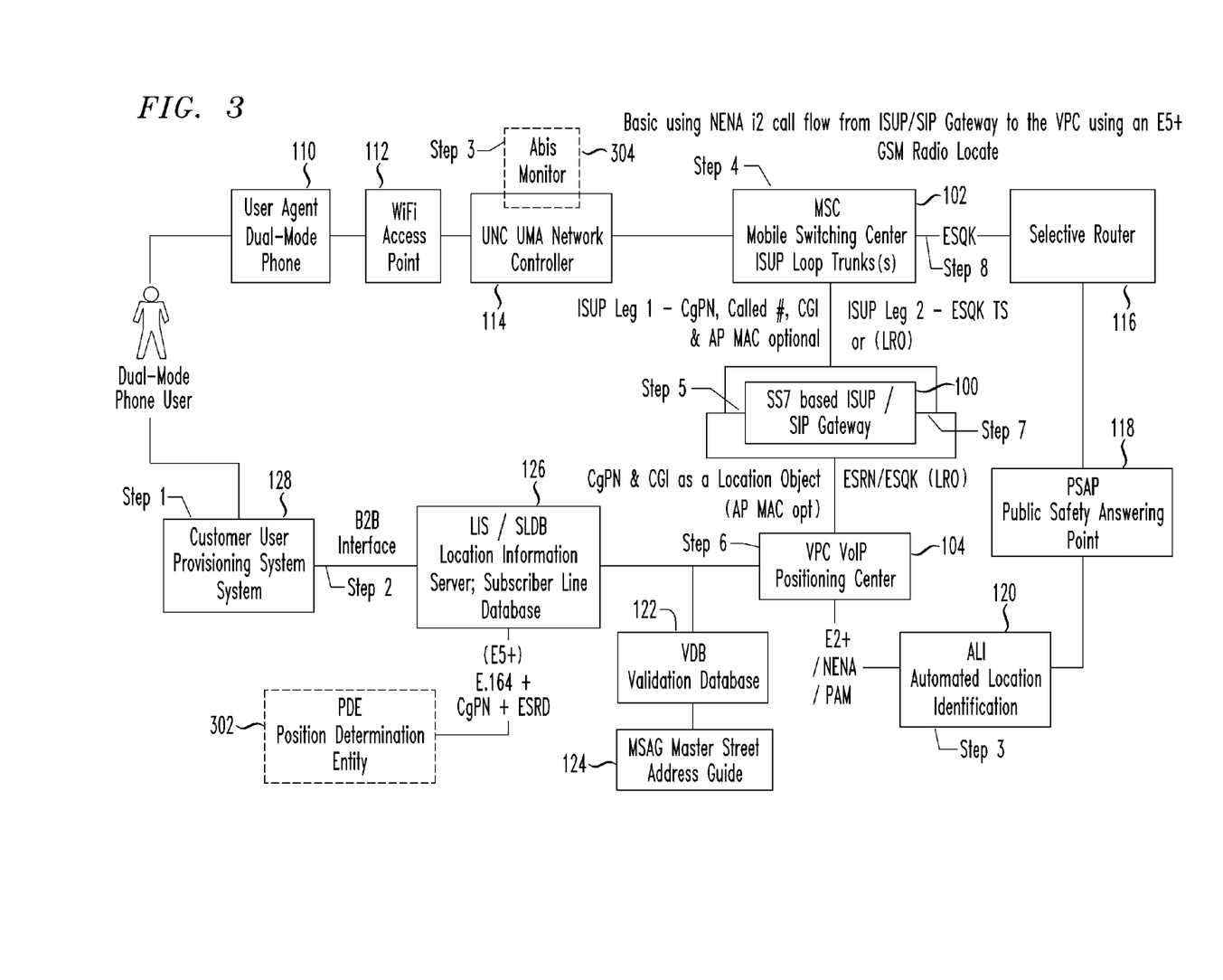
FIG. 3 shows an example location based UMA VoIP E9-1-1 basic call flow architecture using NENA i2 call flow from ISUP/SIP gateway access point MAC address and/or an E5+ position determination entity (PDE) lookup, in accordance with the principles of the present invention.

FIG. 3 shows an example location based UMA VoIP E9-1-1 basic call flow architecture using NENA i2 call flow from ISUP/SIP gateway access point MAC address and/or an E5+ position determination entity (PDE) lookup, in accordance with the principles of the present invention.

In particular, as shown in step 1 of FIG. 3, the user provisions their current location address connected to their phone number or identity via a networked connection.

In step 2, the user location and phone identity data are transmitted to a database via an internetworked connection, and stored there.

In step 3, when the user makes a call that needs location based routing (like 9-1-1) from a WiFi network 112, the call progresses from their dual-mode UMA phone 110 to the UMA network controller (UNC) 114 over VPN on the Internet.

In step 4, calls from UMA subscribers on a WiFi network that require location based routing are translated to an assigned ISUP loop-trunk. In the embodiment of FIG. 3, the IAM outbound message contains the calling party number (CgPN) and called party number (CPN). This is the same as with respect to the embodiment of FIG. 1. However, in the embodiment of FIG. 3, inband delivery of the CGI (or equivalent) is added to inband delivery using the generic digits parameter (GDP).

In step 5, the ISUP/SIP gateway 100 translates the ISUP IAM parameters into SIP Invite parameters.

In step 6, the VoIP positioning center (VPC) 104 assigns routing based upon the location retrieved from the LIS/SLDB 126.

In step 6a, the LIS/SLDB 126 sends a GPOSREQ over an E5+ interface to the position determination entity (PDE) 302. With E5+, the switching control point (SCP) assigns an E.164 by lookup on SS7 point code. A BSIC or CGI will also be passed. This assumes that the GSM radio is on near call initiation.

In step 7, the ISUP/SIP gateway 100 receives routing instruction from the VoIP positioning center (VPC) 104 and sends a routing key (e.g., ESQK) and a trunk select code (e.g. ESRN); or sends last routing option (LRO) as a fallback.

In step 8, the MSC 102 egresses the call based upon ESRN and sends ESQK to the selective router 116, which then routes to the PSAP 118.

In step 9, the PSAP customer premises equipment (CPE) then forms a query to the ALI 120. The ALI 120 then steers that query to the VoIP positioning center 104 based upon the ESQK and its steering tables. The VoIP positioning center (VPC) 104 responds with location (address) information.

In another embodiment, the validation database (VDB) validates the subscriber location address and assigns an MSAG address for delivery to the PSAP 118 to support the ALI query.

Figure 4:
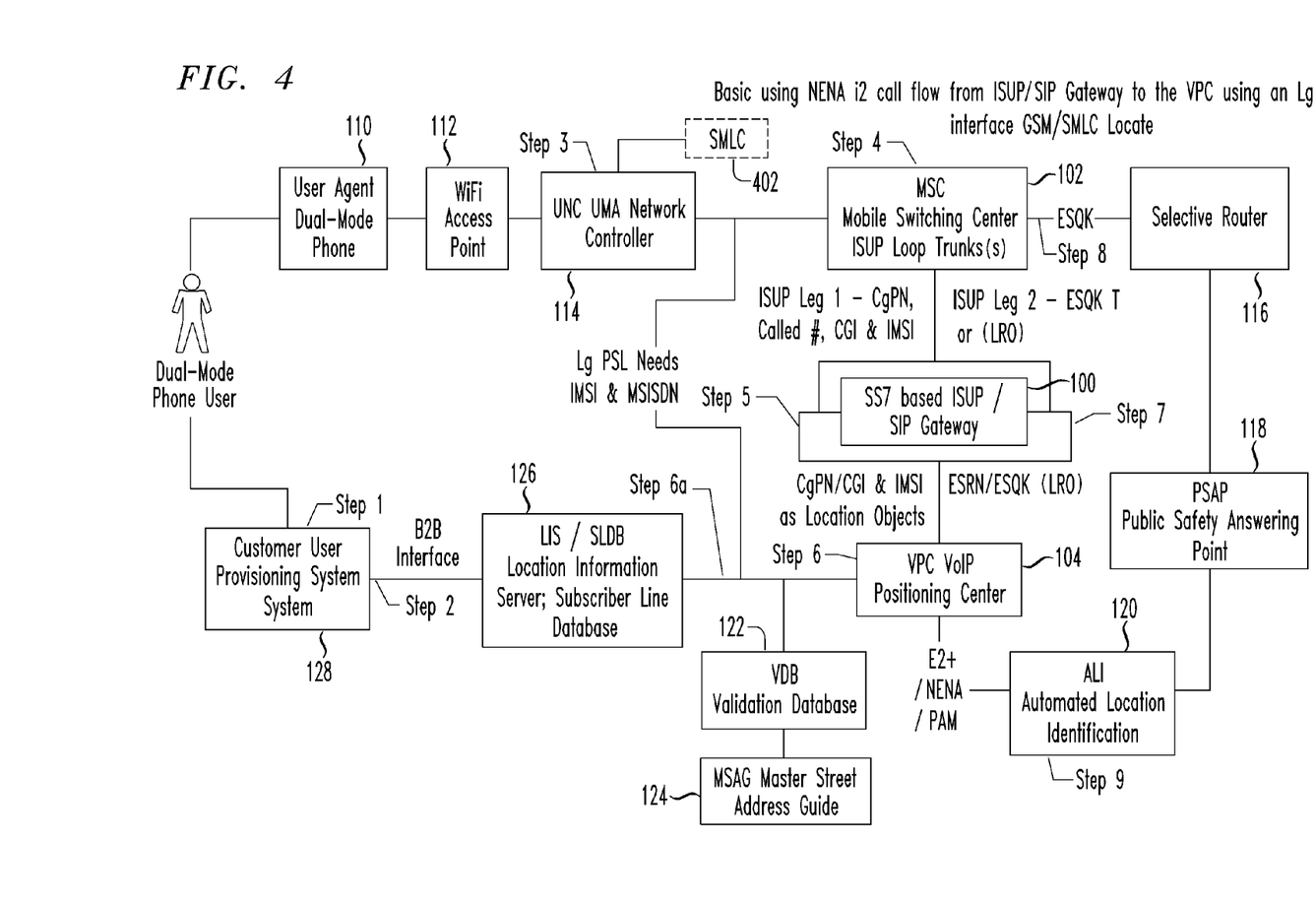
FIG. 4 shows an example location based UMA VoIP E9-1-1 basic call flow architecture using NENA i2 call flow from ISUP/SIP gateway access point MAC address and/or an Lg PSL for location lookup, in accordance with the principles of the present invention.

FIG. 4 shows an example location based UMA VoIP E9-1-1 basic call flow architecture using NENA i2 call flow from ISUP/SIP gateway access point MAC address and/or an Lg PSL for location lookup, in accordance with the principles of the present invention.

In particular, as shown in step 1 of FIG. 4, the user provisions their current location address connected to their phone number or identity via a networked connection.

In step 2, the user location and phone identity data are transmitted to a database via an internetworked connection, and stored there.

In step 3, when the user makes a call that needs location based routing (like 9-1-1) from a WiFi network 112, the call progresses from their dual-mode UMA phone 110 to the UMA network controller (UNC) 114 over VPN on the Internet.

In step 4, calls from UMA subscribers on a WiFi network that require location based routing are translated to an assigned ISUP loop-trunk. In the embodiment of FIG. 4, the IAM outbound message contains the calling party number (CgPN) and called party number (CPN). This is the same as with respect to the embodiment of FIG. 1. However, in the embodiment of FIG. 4, inband delivery of the CGI (or equivalent) is added to inband delivery using the generic digits parameter (GDP) and international mobile subscriber identity (IMSI).

In step 5, the ISUP/SIP gateway 100 translates the ISUP IAM parameters into SIP Invite parameters.

In step 6, the VoIP positioning center (VPC) 104 assigns routing based upon the location retrieved from the LIS/SLDB 126.

In step 6a, the LIS/SLDB 126 sends a location request to the MSC 102 over Lg. The communication (Lg provide subscriber location (PSL) (3GPP)) needs international mobile subscriber identity (IMSI) & mobile station international ISDN number (MSISDN).

In step 7, the ISUP/SIP gateway 100 receives routing instruction from the VoIP positioning center (VPC) 104 and sends a routing key (e.g., ESQK) and a trunk select code (e.g. ESRN); or sends last routing option (LRO) as a fallback.

In step 8, the MSC 102 egresses the call based upon ESRN and sends ESQK to the selective router 116, which then routes to the PSAP 118.

In step 9, the PSAP customer premises equipment (CPE) then forms a query to the ALI 120. The ALI 120 then steers that query to the VoIP positioning center 104 based upon the ESQK and its steering tables. The VoIP positioning center (VPC) 104 responds with location (address) information.

In another embodiment, the validation database (VDB) validates the subscriber location address and assigns an MSAG address for delivery to the PSAP 118 to support the ALI query.

Figure 5:
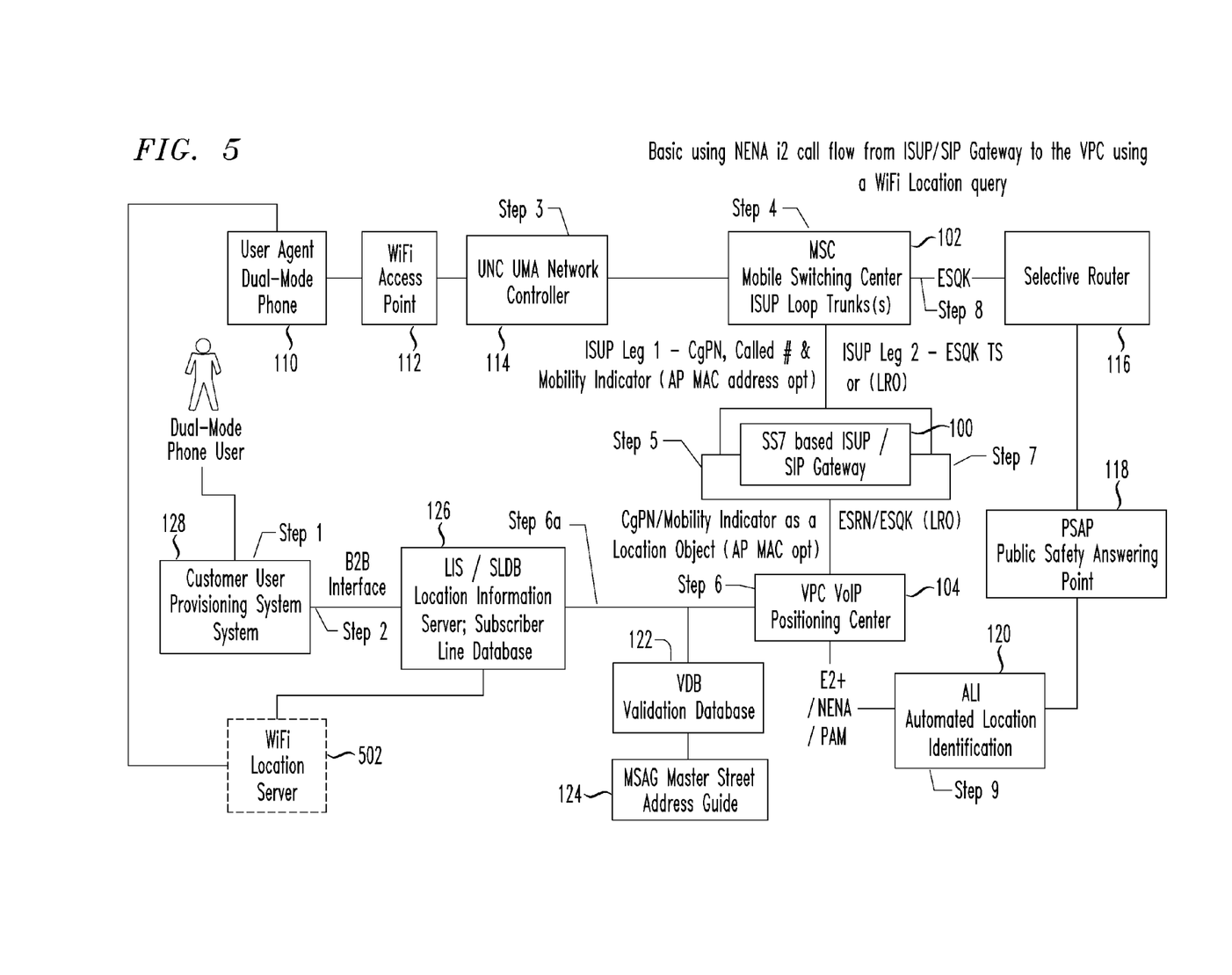
FIG. 5 shows an example location based UMA VoIP E9-1-1 basic call flow architecture using NENA i2 call flow from ISUP/SIP gateway access point MAC address and/or a WiFi location query, in accordance with the principles of the present invention.

FIG. 5 shows an example location based UMA VoIP E9-1-1 basic call flow architecture using NENA i2 call flow from ISUP/SIP gateway access point MAC address and/or a WiFi location query, in accordance with the principles of the present invention.

In particular, as shown in step 1 of FIG. 5, the user provisions their current location address connected to their phone number or identity via a networked connection.

In step 2, the user location and phone identity data are transmitted to a database via an internetworked connection, and stored there.

In step 3, when the user makes a call that needs location based routing (like 9-1-1) from a WiFi network 112, the call progresses from their dual-mode UMA phone 110 to the UMA network controller (UNC) 114 over VPN on the Internet.

In step 4, calls from UMA subscribers on a WiFi network that require location based routing are translated to an assigned ISUP loop-trunk. In the embodiment of FIG. 5, the IAM outbound message contains the calling party number (CgPN) and called party number (CPN). This is the same as with respect to the embodiment of FIG. 1. However, the embodiment of FIG. 5 includes inband delivery of the mobile indicator, and optionally the AP MAC address.

In step 5, the ISUP/SIP gateway 100 translates the ISUP IAM parameters into SIP Invite parameters.

In step 6, the VoIP positioning center (VPC) 104 assigns routing based upon the location retrieved from the LIS/SLDB 126.

In step 6a, the LIS/SLDB 126 sends a location request to the WiFi positioning system server 502.

In step 7, the ISUP/SIP gateway 100 receives routing instruction from the VoIP positioning center (VPC) 104 and sends a routing key (e.g., ESQK) and a trunk select code (e.g. ESRN); or sends last routing option (LRO) as a fallback.

In step 8, the MSC 102 egresses the call based upon ESRN and sends ESQK to the selective router 116, which then routes to the PSAP 118.

In step 9, the PSAP customer premises equipment (CPE) then forms a query to the ALI 120. The ALI 120 then steers that query to the VoIP positioning center 104 based upon the ESQK and its steering tables. The VoIP positioning center (VPC) 104 responds with location (address) information.

In another embodiment, the validation database (VDB) validates the subscriber location address and assigns an MSAG address for delivery to the PSAP 118 to support the ALI query.

Figure 6:
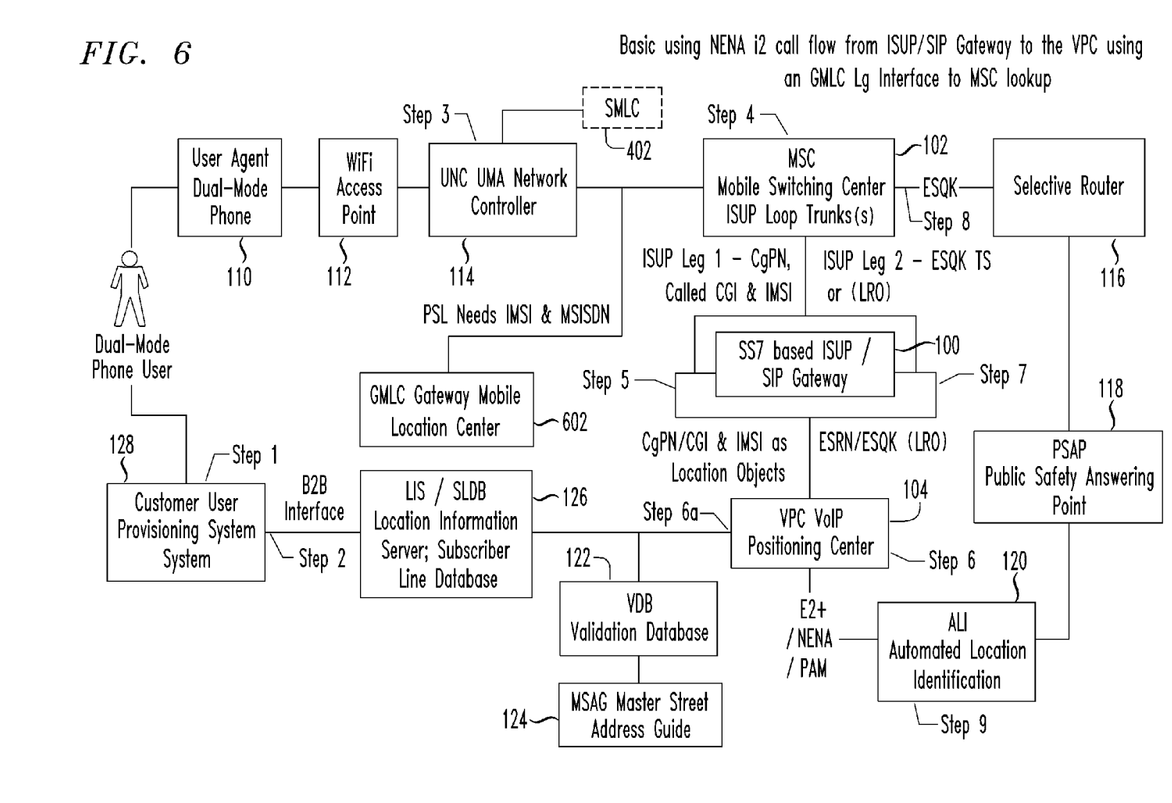
FIG. 6 shows an example location based UMA VoIP E9-1-1 basic call flow architecture using NENA i2 call flow from ISUP/SIP gateway access point MAC address and/or MPC Lg interface to the MSC lookup, in accordance with the principles of the present invention.

FIG. 6 shows an example location based UMA VoIP E9-1-1 basic call flow architecture using NENA i2 call flow from ISUP/SIP gateway access point MAC address and/or MPC Lg interface to the MSC lookup, in accordance with the principles of the present invention.

In particular, as shown in step 1 of FIG. 6, the user provisions their current location address connected to their phone number or identity via a networked connection.

In step 2, the user location and phone identity data are transmitted to a database via an internetworked connection, and stored there.

In step 3, when the user makes a call that needs location based routing (like 9-1-1) from a WiFi network 112, the call progresses from their dual-mode UMA phone 110 to the UMA network controller (UNC) 114 over VPN on the Internet.

In step 4, calls from UMA subscribers on a WiFi network that require location based routing are translated to an assigned ISUP loop-trunk. In the embodiment of FIG. 6, the IAM outbound message contains the calling party number (CgPN) and called party number (CPN). This is the same as with respect to the embodiment of FIG. 1. However, in the embodiment of FIG. 6, inband delivery of the CGI (or equivalent) is added to inband delivery using the generic digits parameter (GDP) and international mobile subscriber identity (IMSI).

In step 5, the ISUP/SIP gateway 100 translates the ISUP IAM parameters into SIP Invite parameters.

In step 6, the VoIP positioning center (VPC) 104 assigns routing based upon the location retrieved from the LIS/SLDB 126.

In step 6a, the VPC 104 sends a location request via E2+ to the GMLC/MSC 102.

In step 7, the ISUP/SIP gateway 100 receives routing instruction from the VoIP positioning center (VPC) 104 and sends a routing key (e.g., ESQK) and a trunk select code (e.g. ESRN); or sends last routing option (LRO) as a fallback.

In step 8, the MSC 102 egresses the call based upon ESRN and sends ESQK to the selective router 116, which then routes to the PSAP 118.

In step 9, the PSAP customer premises equipment (CPE) then forms a query to the ALI 120. The ALI 120 then steers that query to the VoIP positioning center 104 based upon the ESQK and its steering tables. The VoIP positioning center (VPC) 104 responds with location (address) information.

In another embodiment, the validation database (VDB) validates the subscriber location address and assigns an MSAG address for delivery to the PSAP 118 to support the ALI query.

Figure 7:
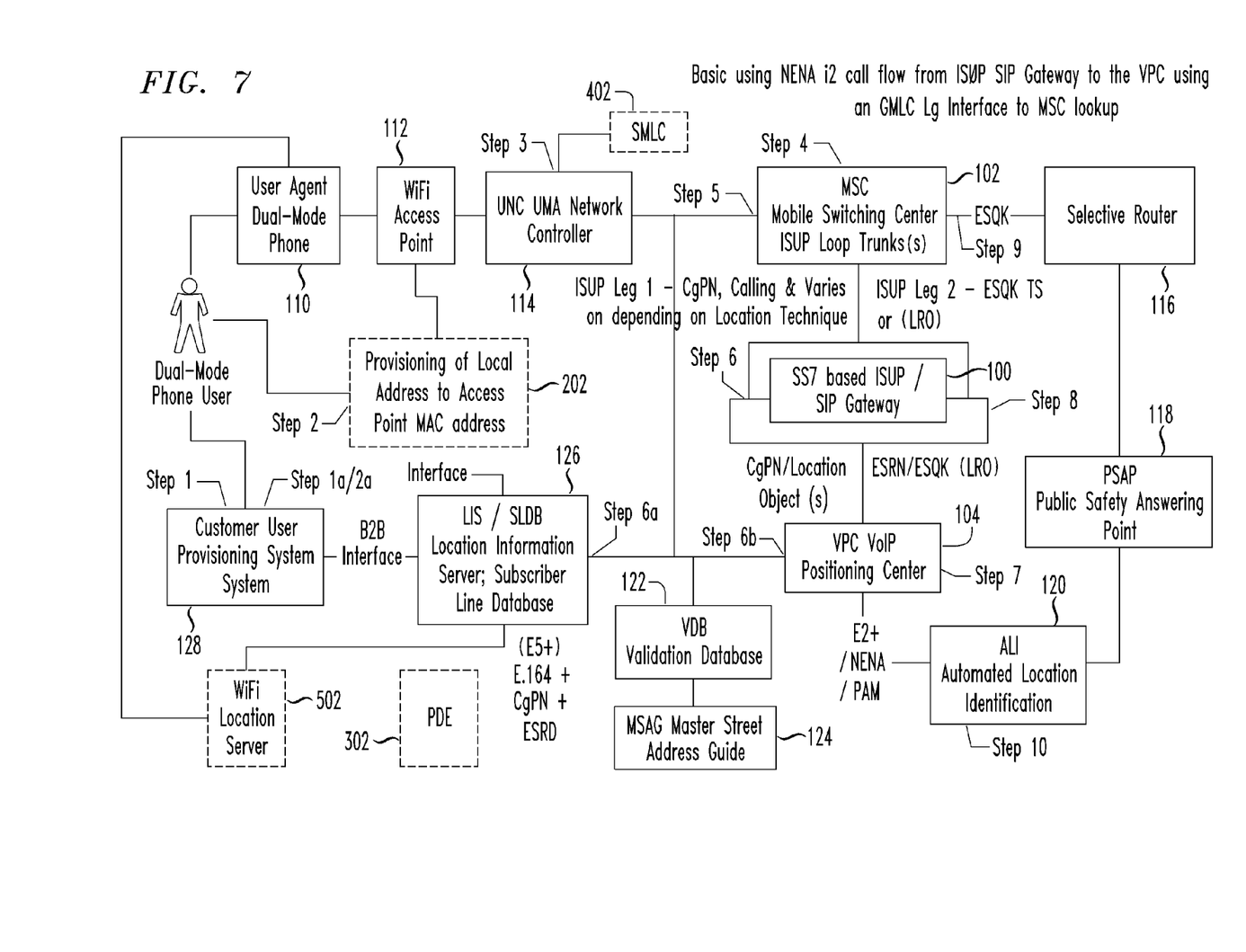
FIG. 7 shows an example location based UMA VoIP E9-1-1 basic call flow architecture using NENA i2 call flow from ISUP/SIP gateway access point MAC address and/or E5+, or Lg interface to the MSC lookup, in accordance with the principles of the present invention.

FIG. 7 shows an example location based UMA VoIP E9-1-1 basic call flow architecture using NENA i2 call flow from ISUP/SIP gateway access point MAC address and/or E5+, or Lg interface to the MSC lookup, in accordance with the principles of the present invention.

In particular, as shown in step 1 of FIG. 7, the user provisions their current location address connected to their phone number or identity via a networked connection.

In step 1a, the user location and phone identity are transmitted to a database via an internetworked connection, and stored there.

In step 2, the user provisions their current location address connected with their access point MAC address.

In step 2a, if not already transmitted in step 1a, the user location and phone identity data are again transmitted to a database via an internetworked connection, and stored there.

In step 3, when the user makes a call that needs location based routing (like 9-1-1) from a WiFi network 112, the call progresses from their dual-mode UMA phone 110 to the UMA network controller (UNC) 114 over VPN on the Internet.

In step 4, calls from UMA subscribers on a WiFi network that require location based routing are translated to an assigned ISUP loop-trunk. In the embodiment of FIG. 7, the IAM outbound message contains the calling party number (CgPN) and called party number (CPN). This is the same as with respect to the embodiment of FIG. 1. However, in the embodiment of FIG. 7, the required delivery technique is dependent upon the location technique used.

In step 5, the access point MAC address is converted from hexadecimal to decimal. This is passed as a 15-digit emergency services routing digit (ESRD) in the ISUP IAM Leg1 parameter.

In step 6, the ISUP/SIP gateway 100 translates the ISUP IAM parameters into SIP Invite parameters.

In step 6a, the LIS/SLDB 126 sends a location request to the MSC 102 over Lg or over an E5+ interface to the position determination entity (PDE) 302 (PDE). With E5+, the switching control point (SCP) assigns an E.164 by lookup on SS7 point code. A BSIC or CGI will also be passed. This assumes that the GSM radio is on near call initiation.

In step 6b, alternatively, the VPC 104 sends an E2+ request to the GMLC.

In step 7, the VoIP positioning center (VPC) 104 assigns routing based upon the location retrieved from the LIS/SLDB 126.

In step 8, the ISUP/SIP gateway 100 receives routing instruction from the VoIP positioning center (VPC) 104 and sends a routing key (e.g., ESQK) and a trunk select code (e.g. ESRN); or sends last routing option (LRO) as a fallback.

In step 9, the MSC 102 egresses the call based upon ESRN and sends ESQK to the selective router 116, which then routes to the PSAP 118.

In step 10, the PSAP customer premises equipment (CPE) then forms a query to the ALI 120. The ALI 120 then steers that query to the VoIP positioning center 104 based upon the ESQK and its steering tables. The VoIP positioning center (VPC) 104 responds with location (address) information.

Figure 8:
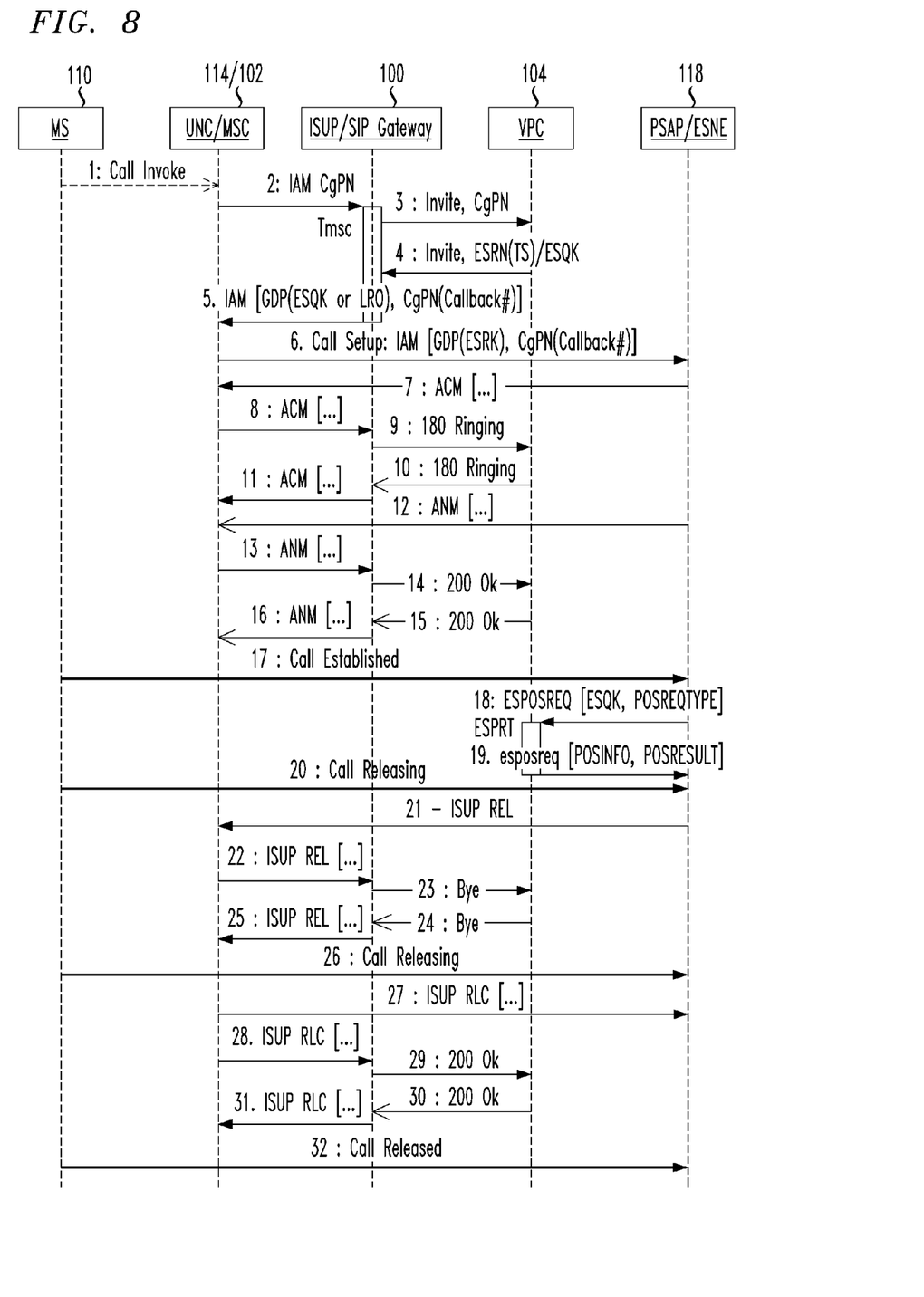
FIG. 8 shows exemplary call flow between a wireless mobile station, a UMA network controller (UNC)/mobile switching center (MSC), an ISUP/SIP gateway in accordance with the present invention, a VoIP positioning center (VPC), and a public safety answering point (PSAP)/emergency services network equipment (ESNE).

FIG. 8 shows exemplary call flow between a wireless mobile station 110, a UMA network controller (UNC) 114/mobile switching center (MSC) 102, an ISUP/SIP gateway 100 in accordance with the present invention, a VoIP positioning center (VPC) 104, and a public safety answering point (PSAP) 118/emergency services network equipment (ESNE).

In particular, as shown in step 1 of FIG. 8, a call invoke message is passed from the MS 110 to the UNC 114/MSC 102.

In step 2, an initial address message (IAM) with the calling party number (CgPN) is transmitted from the UNC 114/MSC 102 to the ISUP/SIP gateway 100.

In step 3, an invite message including the calling party number (CgPN) is passed from the ISUP/SIP gateway 100 to the VoIP positioning center (VPC) 104.

In step 4, an invite message is passed with the ESRN(TS) and ESQK from the VPC 104 to the ISUP/SIP gateway 100.

In step 5, an initial address message (IAM) is sent with GDP(ESQK or last routing option (LRO)), calling party number (CgPN)(callback number) from the ISUP/SIP gateway 100 to the UNC 114/MSC 102.

In step 6, a call setup message IAM [GDP(ESRK), CgPN (Callback#)] is sent from the UNC 114/MSC 102 to the PSAP 118.

In step 7, an ACM message is sent from the PSAP 118 to the UNC 114/MSC 102.

In step 8, an ACM message is sent from the UNC 114/MSC 102 to the ISUP/SIP gateway 100.

In step 9, a 180 ringing message is sent from the ISUP/SIP gateway 100 to the VoIP positioning center 104.

In step 10, a 180 ringing message is sent from the VPC 104 to the ISUP/SIP gateway 100.

In step 11, an ACM message is sent from the ISUP/SIP gateway 100 to the UNC 114/MSC 102.

In step 12, an ANM message is sent from the PSAP 118 to the UNC 114/MSC 102.

In step 13, an ANM message is sent from the UNC 114/MSC 102 to the ISUP/SIP gateway 100.

In steps 14 and 15, a 200 Ok message is exchanged between the ISUP/SIP gateway 100 and the VPC 104.

In step 16, an ANM message is sent from the ISUP/SIP gateway 100 to the UNC 114/MSC 102.

In step 17, the call is established between the mobile device 110 and the PSAP 118.

In step 18, an ESPOSREQ[ESRK, POSREQTYPE] message is passed from the PSAP 118 to the VPC 104.

In step 19, an esposreq[POSINFO, POSRESULT] message is passed back from the VPC 104 to the requesting PSAP 118.

In step 20, the call is released.

In step 21, to effect the release of the call, an ISUP REL message is passed from the mobile device 110 to the PSAP 118.

In step 22, an ISUP REL[ . . . ] message is passed from the UNC 114/MSC 102 to the ISUP/SIP gateway 100.

In steps 23 and 24, a Bye message is exchanged between the ISUP/SIP gateway 100 and the VPC 104.

In step 25, an ISUP REL[ . . . ] message is passed from the ISUP/SIP gateway 100 to the UNC 114/MSC 102.

In step 26, call releasing is performed.

In step 27, an ISUP RLC [ . . . ] message is passed from the UNC 114/MSC 102 to the PSAP 118.

In step 28, an ISUP RLC[ . . . ] message is passed from the UNC 114/MSC 102 to the ISUP/SIP gateway 100.

In steps 29 and 30, a 200 Ok message is exchanged between the ISUP/SIP gateway 100 and the VPC 104.

In step 31, an ISUP RLC[ . . . ] message is sent from the ISUP/SIP gateway 100 to the UNC 114/MSC 102.

In step 32, release of the call between the mobile device 110 and the PSAP 118 is complete.

Benefits of the invention include lower cost of integration of VoIP E9-1-1 into a carriers existing wireless infrastructure.

The invention has particular application with consumers using UMA enabled dual-mode (e.g., WiFi/GSM/CDMA) handsets. It also has applicability in the development of ISUP/SIP Gateways, and is non-application specific.

While the invention has been described with reference to the exemplary embodiments thereof, those skilled in the art will be able to make various modifications to the described embodiments of the invention without departing from the true spirit and scope of the invention.

What is claimed is:

1. A SIP gateway, comprising:
   a receiver to receive a location-based request message including a calling party ID, said location request message having been initiated via a non-SIP network element;
   a SIP encapsulation module to encapsulate said location-based request message within a SIP message;
   a transmitter to transmit said SIP message including said calling party ID to a positioning center;
   a SIP message receiver module to receive another SIP message including location-based information, back from said positioning center; and
   an initial message transmitter module to transmit an initial message including said location-based information back to said non-SIP network element.

2. The SIP gateway according to claim 1, wherein said positioning center comprises:
   a Voice over Internet Protocol (VoIP) positioning center.

3. The SIP gateway according to claim 1, wherein said calling party ID comprises:
   a calling party number.

4. The SIP gateway according to claim 1, wherein said SIP message comprises:
   a SIP invite message.

5. The SIP gateway according to claim 1, wherein said location-based information comprises:
   routing information.

6. The SIP gateway according to claim 5, wherein said routing information comprises:
   a routing number.

7. The SIP gateway according to claim 6, wherein said routing number comprises:
   an emergency services routing number (ESRN).

* * * * *